United States Patent
Wang

(10) Patent No.: US 10,684,054 B2
(45) Date of Patent: Jun. 16, 2020

(54) TENSION SUPPORT SYSTEM FOR MOTORIZED FAN

(71) Applicant: Trane International Inc., Davison, NC (US)

(72) Inventor: Percy F. Wang, Tyler, TX (US)

(73) Assignee: Trane International Inc., Davidson, NC (US)

( * ) Notice: Subject to any disclaimer, the term of this patent is extended or adjusted under 35 U.S.C. 154(b) by 185 days.

(21) Appl. No.: 15/601,255

(22) Filed: May 22, 2017

(65) Prior Publication Data

US 2018/0335053 A1  Nov. 22, 2018

(51) Int. Cl.
| | |
|---|---|
| *F25B 49/02* | (2006.01) |
| *F04D 25/08* | (2006.01) |
| *F04D 29/60* | (2006.01) |
| *F25B 1/04* | (2006.01) |

(52) U.S. Cl.
CPC .......... *F25B 49/022* (2013.01); *F04D 25/088* (2013.01); *F04D 29/601* (2013.01); *F25B 1/04* (2013.01); *F25B 2313/02741* (2013.01); *F25B 2313/0314* (2013.01); *F25B 2600/0253* (2013.01); *F25B 2700/02* (2013.01)

(58) Field of Classification Search
CPC ...... F24F 1/38; F24F 1/40; H02K 5/25; F04D 29/626; F04D 29/66; F04D 29/661; F04D 29/668
See application file for complete search history.

(56) References Cited

U.S. PATENT DOCUMENTS

| | | | | |
|---|---|---|---|---|
| 1,786,203 | A | * | 12/1930 | Gilbert .............. F24F 7/013 454/210 |
| 1,873,343 | A | * | 8/1932 | Seyfried .......... F04D 29/646 248/604 |
| 2,028,985 | A | * | 1/1936 | Mahon ............ F04D 29/646 415/119 |
| 2,467,296 | A | * | 4/1949 | Doe ................ F04D 17/165 248/604 |
| 2,874,898 | A | * | 2/1959 | Bayhi .............. F04D 29/646 415/223 |
| 2,881,995 | A | * | 4/1959 | Neher ............. F04D 29/646 248/604 |
| 3,317,124 | A | * | 5/1967 | Morrill ........... F04D 29/646 417/363 |
| 4,063,060 | A | * | 12/1977 | Litch, III ........ F04D 29/282 219/93 |
| 4,323,217 | A | * | 4/1982 | Dochterman .... H02K 5/00 248/604 |

(Continued)

FOREIGN PATENT DOCUMENTS

| | | | | |
|---|---|---|---|---|
| WO | WO-2014112047 | A1 * | 7/2014 | ......... F24F 1/38 |
| WO | WO-2017126296 | A1 * | 7/2017 | ......... F24F 1/38 |
| WO | WO-2017168887 | A1 * | 10/2017 | ......... F04D 27/00 |

*Primary Examiner* — Cassey D Bauer
(74) *Attorney, Agent, or Firm* — Conley Rose, P.C.; J. Robert Brown, Jr.; Albert A. Abbou

(57) ABSTRACT

A tension support system for a motorized fan is provided. The tension support system includes a fan assembly disposed within a fan housing, the fan assembly including a motor configured to selectively operate the fan assembly. The tension support system further includes multiple connectors configured to secure the motor to inner walls of the fan housing such that the fan assembly is substantially supported by the inner walls.

20 Claims, 6 Drawing Sheets

(56) References Cited

U.S. PATENT DOCUMENTS

| | | | | | |
|---|---|---|---|---|---|
| 4,498,374 | A * | 2/1985 | Gibson | | F24F 13/32 |
| | | | | | 454/204 |
| 4,572,472 | A * | 2/1986 | Eder | | H02K 5/24 |
| | | | | | 248/603 |
| 4,594,018 | A * | 6/1986 | Larsson | | F16G 11/12 |
| | | | | | 403/43 |
| 5,299,429 | A * | 4/1994 | Swink | | F04D 29/646 |
| | | | | | 62/507 |
| 5,341,871 | A * | 8/1994 | Stelzer | | F01P 5/02 |
| | | | | | 165/121 |
| 5,492,456 | A * | 2/1996 | Knight | | F04D 29/626 |
| | | | | | 248/604 |
| 6,074,182 | A * | 6/2000 | Matson | | F04D 25/08 |
| | | | | | 417/423.14 |
| 6,761,343 | B2 * | 7/2004 | Clark | | F16M 7/00 |
| | | | | | 248/300 |
| 7,358,631 | B2 * | 4/2008 | Morishitahara | | F04D 25/0613 |
| | | | | | 310/71 |
| 7,458,556 | B1 * | 12/2008 | Manucy | | F16F 15/085 |
| | | | | | 248/676 |
| 7,885,065 | B2 * | 2/2011 | Kaneko | | F04D 25/0613 |
| | | | | | 361/679.48 |
| 7,963,121 | B2 * | 6/2011 | Ishida | | F24F 1/38 |
| | | | | | 62/428 |
| 2006/0280632 | A1 * | 12/2006 | Sugiyama | | F04D 25/0613 |
| | | | | | 417/423.5 |
| 2013/0026334 | A1 * | 1/2013 | Long | | F04D 25/08 |
| | | | | | 248/675 |
| 2013/0239605 | A1 * | 9/2013 | Oh | | F04D 25/08 |
| | | | | | 62/428 |
| 2014/0245776 | A1 * | 9/2014 | Choi | | F24F 1/38 |
| | | | | | 62/426 |
| 2015/0260199 | A1 * | 9/2015 | Hollan | | F04D 25/088 |
| | | | | | 416/244 R |
| 2016/0097548 | A1 * | 4/2016 | Wang | | F04D 25/0613 |
| | | | | | 62/507 |
| 2016/0187005 | A1 * | 6/2016 | Kwon | | F24F 1/40 |
| | | | | | 62/259.1 |
| 2016/0273788 | A1 * | 9/2016 | Cho | | F24F 1/38 |
| 2017/0248330 | A1 * | 8/2017 | Nezu | | F24F 1/38 |
| 2017/0343224 | A1 * | 11/2017 | Kasugai | | F24F 1/38 |
| 2017/0343268 | A1 * | 11/2017 | Martens | | F03D 1/04 |
| 2018/0073750 | A1 * | 3/2018 | Kim | | F24F 1/56 |
| 2018/0087797 | A1 * | 3/2018 | Han | | F24F 11/81 |
| 2018/0106485 | A1 * | 4/2018 | Kono | | F24F 1/48 |
| 2018/0274800 | A1 * | 9/2018 | Aoyama | | F24F 1/50 |

* cited by examiner

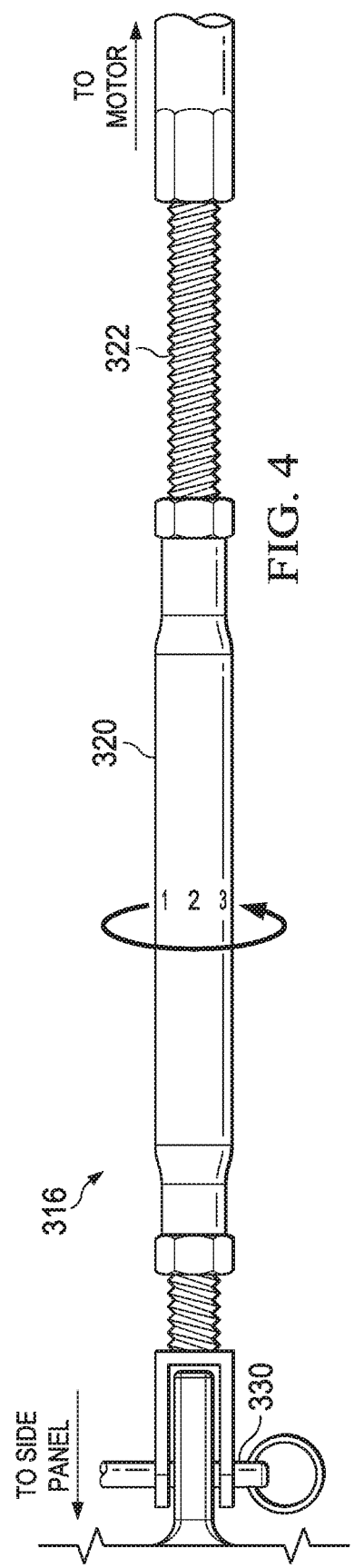

US 10,684,054 B2

TENSION SUPPORT SYSTEM FOR MOTORIZED FAN

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Heating, ventilation, and/or air conditioning (HVAC) systems may generally be used in residential and/or commercial structures to provide heating and/or cooling in order to create comfortable temperatures inside areas associated with such structures. To provide conditioned airflow into such conditioned areas, most HVAC systems employ a fan to move the conditioned air through the HVAC system and into the climate conditioned areas. A housing structure may be provided to protect the fan and other components associated with the HVAC system.

SUMMARY OF THE DISCLOSURE

In an embodiment, a tension support system is disclosed. The tension support system includes a fan assembly disposed within a fan housing, the fan assembly comprising a motor configured to selectively operate the fan assembly. The tension support system further includes multiple connectors configured to secure the motor to the inner walls of the fan housing such that the fan assembly is substantially supported by the inner walls.

In another embodiment, a heating, ventilation, and/or air conditioning (HVAC) system is disclosed. The HVAC system includes an air conditioning unit and a fan assembly disposed within the air conditioning unit. The HVAC system further includes multiple connectors coupling a motor of the fan assembly to inner walls of the air conditioning unit such that the fan assembly directly suspends from the inner walls.

For the purpose of clarity, any one of the embodiments disclosed herein may be combined with any one or more other embodiments disclosed herein to create a new embodiment within the scope of the present disclosure.

BRIEF DESCRIPTION OF THE DRAWINGS

For a more complete understanding of the present disclosure and the advantages thereof, reference is now made to the following brief description, taken in connection with the accompanying drawings and detailed description:

FIG. 4 is a schematic diagram of a connecting rod according to an embodiment of the disclosure;

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In typical HVAC systems, the motor of a fan is often mounted to the underside of a top panel (or cover) of an air conditioning unit, which houses components such as the fan, compressor, condenser, etc. One drawback with such systems is that it may be relatively difficult and/or inconvenient to remove the top cover (e.g., when servicing the air conditioning unit or inspecting parts thereof). Another drawback is that the fan's motor may vibrate during operation of the fan. Vibrations emanating from the motor may cause the air conditioning unit to exhibit structural resonance, which may compromise the structural integrity of the air conditioning unit (e.g., parts thereof may loosen and/or become damaged over time). Vibrations from the motor may also produce unpleasant noises, particularly when operating the fan at relatively high speeds. Additionally, some air conditioning units include a brace or beam for supporting a fan motor assembly. However, due to design limitations, the brace or beam may be placed within an air conditioning unit such that airflow is at least partially disrupted. To overcome these and other drawbacks, embodiments of the present disclosure provide a tension support system configured to mount a motorized fan assembly independently from the top panel (or cover) of an air conditioning unit, which may experience minimal structural resonance during operation of the motorized fan.

Figure 1:
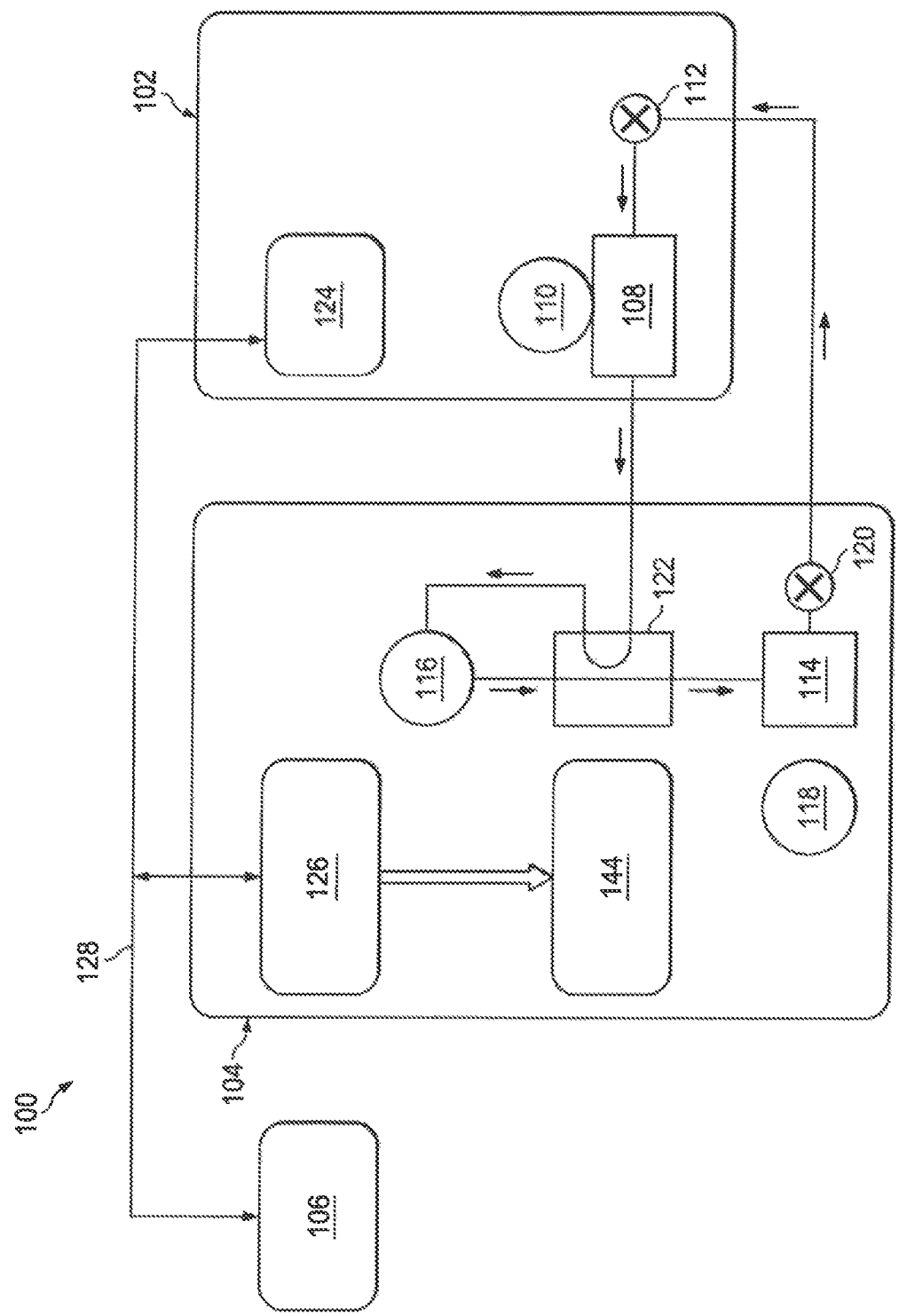
FIG. 1 is a schematic diagram of a heating, ventilation, and/or air conditioning (HVAC) system according to an embodiment of the disclosure.

Referring now to FIG. 1, a schematic diagram of a heating, ventilation, and/or air conditioning (HVAC) system 100 is shown according to an embodiment of the disclosure. Most generally, the HVAC system 100 may be configured to implement one or more substantially closed thermodynamic refrigeration cycles to provide a cooling functionality (hereinafter "cooling mode") and/or a heating functionality (hereinafter "heating mode"). The HVAC system 100 may comprise an indoor unit 102, an outdoor unit 104, and a system controller 106 that may generally control operation of the indoor unit 102 and/or the outdoor unit 104. While HVAC system 100 is shown as a so-called split system comprising an indoor unit 102 located separately from the outdoor unit 104, alternative embodiments of the HVAC system 100 may comprise a so-called package system in which one or more of the components of the indoor unit 102 and one or more of the components of the outdoor unit 104 are carried together in a common housing or package.

The indoor unit 102 generally comprises an indoor air handling unit comprising an indoor heat exchanger 108, an indoor fan 110, an indoor metering device 112, and an indoor controller 124. The indoor heat exchanger 108 may generally be configured to promote heat exchange between refrigerant carried within internal tubing of the indoor heat exchanger 108 and an airflow that may contact the indoor heat exchanger 108 but that is segregated from the refrigerant. In some embodiments, the indoor heat exchanger 108 may comprise a plate-fin heat exchanger. However, in other embodiments, indoor heat exchanger 108 may comprise a microchannel heat exchanger and/or any other suitable type of heat exchanger.

The indoor fan 110 may generally comprise an axial fan comprising a fan blade assembly and a fan motor configured to selectively rotate the fan blade assembly. Additionally or alternatively, the indoor fan 110 may comprise a variable speed blower comprising a blower housing, a blower impeller at least partially disposed within the blower housing, and a blower motor configured to selectively rotate the blower impeller. The indoor fan 110 may generally be configured to provide airflow through the indoor unit 102 and/or the indoor heat exchanger 108 to promote heat transfer between the airflow and a refrigerant flowing through the indoor heat exchanger 108. The indoor fan 110 may also be configured to deliver temperature-conditioned air from the indoor unit 102 to one or more areas and/or zones of a climate controlled structure. The indoor fan 110 may generally be configured as a modulating and/or variable speed fan capable of being operated at many speeds over one or more ranges of speeds.

In some embodiments, the indoor fan 110 may comprise a single speed fan. In other embodiments, the indoor fan 110 may be configured as a multiple speed fan capable of being operated at a plurality of operating speeds by selectively electrically powering different ones of multiple electromagnetic windings of a motor of the indoor fan 110. Additionally or alternatively, indoor fan 110 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118.

The indoor metering device 112 may generally comprise an electronically-controlled motor-driven electronic expansion valve (EEV). In some embodiments, however, the indoor metering device 112 may comprise a thermostatic expansion valve, a capillary tube assembly, and/or any other suitable metering device. While the indoor metering device 112 may be configured to meter the volume and/or flow rate of refrigerant through the indoor metering device 112, the indoor metering device 112 may also comprise and/or be associated with a refrigerant check valve and/or refrigerant bypass configuration when the direction of refrigerant flow through the indoor metering device 112 is such that the indoor metering device 112 is not intended to meter or otherwise substantially restrict flow of the refrigerant through the indoor metering device 112.

The outdoor unit 104 generally comprises an outdoor heat exchanger 114, a compressor 116, an outdoor fan 118, an outdoor metering device 120, a reversing valve 122, and an outdoor controller 126. In some embodiments, the outdoor unit 104 may also comprise a plurality of temperature sensors for measuring the temperature of the outdoor heat exchanger 114, the compressor 116, and/or the outdoor ambient temperature. The outdoor heat exchanger 114 may generally be configured to promote heat transfer between a refrigerant carried within internal passages of the outdoor heat exchanger 114 and an airflow that contacts the outdoor heat exchanger 114 but that is segregated from the refrigerant. According to some implementations, the outdoor heat exchanger 114 may comprise a plate-fin heat exchanger. According to other implementations, the outdoor heat exchanger 114 may comprise a spine-fin heat exchanger, a microchannel heat exchanger, or any other suitable type of heat exchanger.

The compressor 116 may generally comprise a variable speed scroll-type compressor that may generally be configured to selectively pump refrigerant at a plurality of mass flow rates through the indoor unit 102, the outdoor unit 104, and/or between the indoor unit 102 and the outdoor unit 104. In some embodiments, the compressor 116 may comprise a rotary type compressor configured to selectively pump refrigerant at a plurality of mass flow rates. In alternative embodiments, the compressor 116 may comprise a modulating compressor that is capable of operation over a plurality of speed ranges, a reciprocating-type compressor, a single speed compressor, and/or any other suitable refrigerant compressor and/or refrigerant pump. According to some implementations, the compressor 116 may be controlled by a compressor drive controller 144, also referred to as a compressor drive and/or a compressor drive system.

The outdoor fan 118 may generally comprise an axial fan comprising a fan blade assembly and a fan motor configured to selectively rotate the fan blade assembly. The outdoor fan 118 may generally be configured to provide airflow through the outdoor unit 104 and/or the outdoor heat exchanger 114 to promote heat transfer between the airflow and a refrigerant flowing through the outdoor heat exchanger 114. The outdoor fan 118 may generally be configured as a modulating and/or variable speed fan capable of being operated at a plurality of speeds over a plurality of speed ranges. Additionally or alternatively, the outdoor fan 118 may comprise a mixed-flow fan, a centrifugal blower, and/or any other suitable type of fan and/or blower, such as a multiple speed fan capable of being operated at a plurality of operating speeds by selectively electrically powering different multiple electromagnetic windings of a motor of the outdoor fan 118. In some embodiments, the outdoor fan 118 may be a single speed fan.

The outdoor metering device 120 may generally comprise a thermostatic expansion valve. In some embodiments, however, the outdoor metering device 120 may comprise an electronically-controlled motor driven EEV similar to indoor metering device 112, a capillary tube assembly, and/or any other suitable metering device. While the outdoor metering device 120 may be configured to meter the volume and/or flow rate of refrigerant through the outdoor metering device 120, the outdoor metering device 120 may also comprise and/or be associated with a refrigerant check valve and/or refrigerant bypass configuration when the direction of refrigerant flow through the outdoor metering device 120 is such that the outdoor metering device 120 is not intended to meter or otherwise substantially restrict flow of the refrigerant through the outdoor metering device 120.

The reversing valve 122 may generally comprise a four-way reversing valve. The reversing valve 122 may also comprise an electrical solenoid, relay, and/or other device configured to selectively move a component of the reversing valve 122 between operational positions to alter the flowpath of refrigerant through the reversing valve 122 and consequently the HVAC system 100. Additionally, the reversing valve 122 may also be selectively controlled by the system controller 106 and/or an outdoor controller 126.

The system controller 106 may generally be configured to selectively communicate with an indoor controller 124 of the indoor unit 102, an outdoor controller 126 of the outdoor unit 104, and/or other components of the HVAC system 100. In some embodiments, the system controller 106 may be configured to control operation of the indoor unit 102 and/or the outdoor unit 104. The system controller 106 may also be configured to monitor and/or communicate with a plurality of temperature sensors associated with components of the indoor unit 102, the outdoor unit 104, and/or the ambient outdoor temperature. According to some implementations, the system controller 106 may comprise a temperature sensor and/or a humidity sensor and/or may further be configured to control heating and/or cooling of zones associated with the HVAC system 100. Additionally or alternatively, the system controller 106 may be configured as a thermostat for controlling the supply of conditioned air to zones associated with the HVAC system 100.

The system controller 106 may also generally comprise an input/output (I/O) unit such as a graphical user interface (GUI), a touchscreen interface, or any suitable interface for displaying information and/or receiving user inputs. The system controller 106 may display information related to the operation of the HVAC system 100 and may receive user inputs related to the operation of the HVAC system 100. However, the system controller 106 may further be operable to display information and receive user inputs tangentially and/or unrelated to operation of the HVAC system 100. In some implementations, the system controller 106 may not comprise a display and may derive all information from inputs from remote sensors and remote configuration tools.

In some embodiments, the system controller 106 may be configured for selective bidirectional communication over a communication bus 128. According to one aspect, portions of the communication bus 128 may comprise a three-wire connection suitable for communicating messages between the system controller 106 and one or more of the HVAC system 100 components configured for interfacing with the communication bus 128.

The indoor controller 124 may be carried by the indoor unit 102 and may generally be configured to receive information inputs, transmit information outputs, and/or otherwise communicate with the system controller 106, the outdoor controller 126, and/or any other device via the communication bus 128 and/or any other suitable medium of communication. In some embodiments, the indoor controller 124 may be configured to receive information related to a speed of the indoor fan 110, transmit a control output to an auxiliary heat source, transmit information regarding an indoor fan 110 volumetric flow-rate, communicate with and/or otherwise affect control over an air cleaner, and communicate with an indoor EEV controller. In addition, the indoor controller 124 may be configured to communicate with an indoor fan 110 controller and/or otherwise affect control over operation of the indoor fan 110.

The outdoor controller 126 may be carried by the outdoor unit 104 and may be configured to receive information inputs, transmit information outputs, and/or otherwise communicate with the system controller 106, the indoor controller 124, any other device via the communication bus 128, and/or any other suitable medium of communication. In some embodiments, the outdoor controller 126 may be configured to receive information related to an ambient temperature associated with the outdoor unit 104, information related to a temperature of the outdoor heat exchanger 114, and/or information related to refrigerant temperatures and/or pressures of refrigerant entering, exiting, and/or within the outdoor heat exchanger 114 and/or the compressor 116. In addition, the outdoor controller 126 may be configured to transmit information related to monitoring, communicating with, and/or otherwise affecting control over the compressor 116, the outdoor fan 118, a solenoid of the reversing valve 122, a relay associated with adjusting and/or monitoring a refrigerant charge of the HVAC system 100, a position of the indoor metering device 112, and/or a position of the outdoor metering device 120. The outdoor controller 126 may further be configured to communicate with and/or control a compressor drive controller 144 that is configured to electrically power and/or control the compressor 116.

The HVAC system 100 is shown configured for operating in a so-called cooling mode in which heat is absorbed by refrigerant at the indoor heat exchanger 108 and heat is rejected from the refrigerant at the outdoor heat exchanger 114. In some embodiments, the compressor 116 may be operated to compress refrigerant and pump the relatively high temperature and high pressure compressed refrigerant from the compressor 116 to the outdoor heat exchanger 114 through the reversing valve 122 and to the outdoor heat exchanger 114. As the refrigerant is passed through the outdoor heat exchanger 114, the outdoor fan 118 may be operated to move air into contact with the outdoor heat exchanger 114, thereby transferring heat from the refrigerant to the air surrounding the outdoor heat exchanger 114. The refrigerant may primarily comprise liquid phase refrigerant and the refrigerant may flow from the outdoor heat exchanger 114 to the indoor metering device 112 through and/or around the outdoor metering device 120 which does not substantially impede flow of the refrigerant in the cooling mode. The indoor metering device 112 may meter passage of the refrigerant through the indoor metering device 112 so that the refrigerant downstream of the indoor metering device 112 is at a lower pressure than the refrigerant upstream of the indoor metering device 112. The pressure differential across the indoor metering device 112 allows the refrigerant downstream of the indoor metering device 112 to expand and/or at least partially convert to a two-phase (vapor and gas) mixture. The two-phase refrigerant may enter the indoor heat exchanger 108. As the refrigerant is passed through the indoor heat exchanger 108, the indoor fan 110 may be operated to move air into contact with the indoor heat exchanger 108, thereby transferring heat to the refrigerant from the air surrounding the indoor heat exchanger 108, and causing evaporation of the liquid portion of the two-phase mixture. The refrigerant may thereafter re-enter the compressor 116 after passing through the reversing valve 122.

To operate the HVAC system 100 in the so-called heating mode, the reversing valve 122 may be controlled to alter the flow path of the refrigerant, the indoor metering device 112 may be disabled and/or bypassed, and the outdoor metering device 120 may be enabled. In the heating mode, refrigerant may flow from the compressor 116 to the indoor heat exchanger 108 through the reversing valve 122, the refrigerant may be substantially unaffected by the indoor metering device 112, the refrigerant may experience a pressure differential across the outdoor metering device 120, the refrigerant may pass through the outdoor heat exchanger 114, and the refrigerant may re-enter the compressor 116 after passing through the reversing valve 122. Most generally, operation of the HVAC system 100 in the heating mode reverses the roles of the indoor heat exchanger 108 and the outdoor heat exchanger 114 as compared to their operation in the cooling mode.

Figure 2:
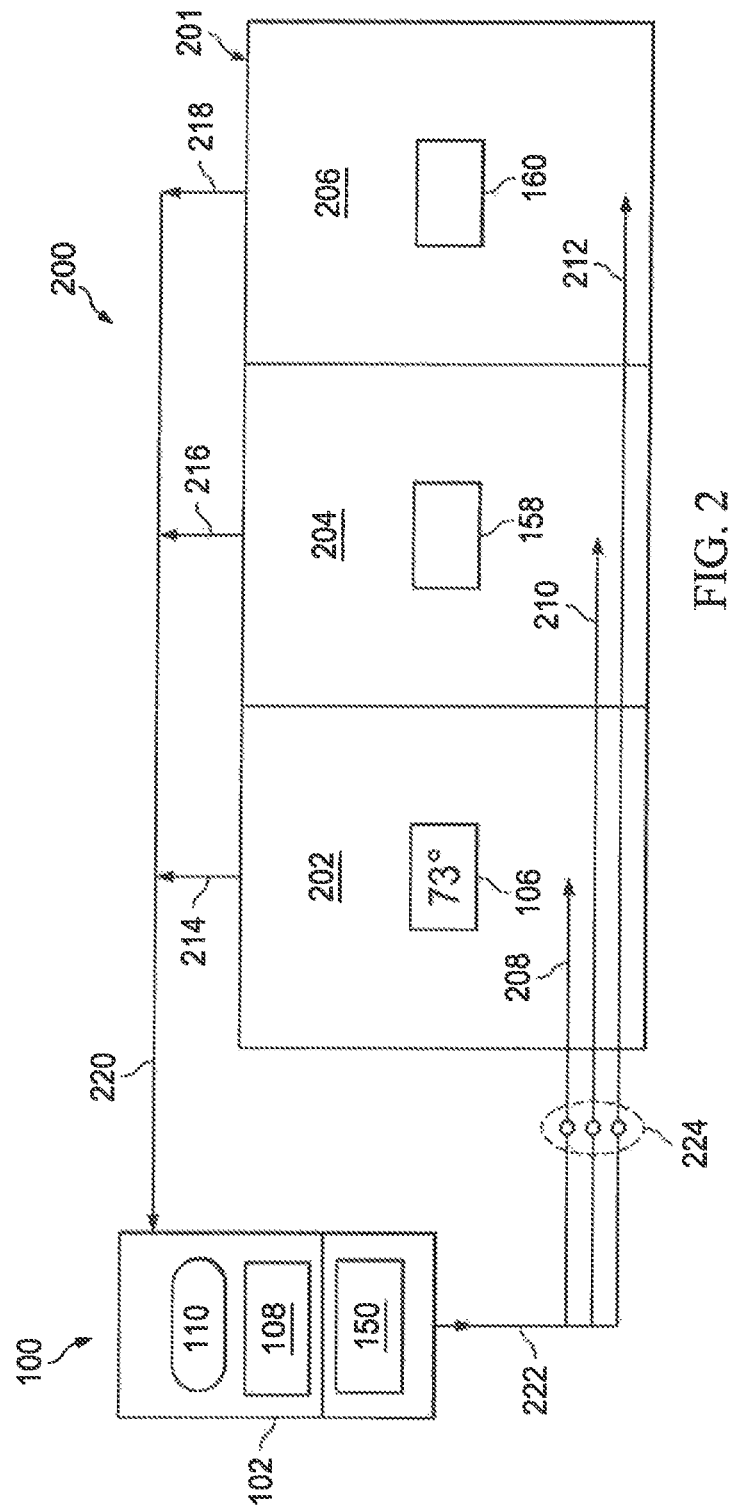
FIG. 2 is a schematic diagram of an air circulation path of the HVAC system of FIG. 1 according to an embodiment of the disclosure.

Referring now to FIG. 2, a schematic diagram of an air circulation path 200 of the HVAC system 100 of FIG. 1 is shown according to an embodiment of the disclosure. The HVAC system 100 of FIG. 1 may generally comprise an indoor fan 110 configured to circulate and/or condition air through a plurality of zones 202, 204, 206 of a structure 201.

It will be appreciated that while three zones 202, 204, 206 are shown, any number of zones may be present in the structure 201. The air circulation path 200 of the HVAC system 100 may generally comprise a first zone supply duct 208, a second zone supply duct 210, a third zone supply duct 212, a first zone return duct 214, a second zone return duct 216, a third zone return duct 218, a main return duct 220, a main supply duct 222, a plurality of zone dampers 224, and an indoor unit 102 comprising an indoor heat exchanger 108, and an indoor fan 110. In some embodiments, the HVAC system 100 may also comprise a heat source 150, which may comprise electrical resistance heating elements installed in the indoor unit 102. However, in other embodiments, the heat source 150 may comprise a furnace configured to burn fuel such as, but not limited to, natural gas, heating oil, propane, and/or any other suitable fuel, to generate heat. In embodiments where the heat source 150 comprises a furnace, it will be appreciated that the furnace may also comprise an inducer blower substantially similar to the indoor fan 110 that may be configured to circulate an air-fuel mixture through the furnace.

Additionally, the HVAC system 100 may further comprise a zone thermostat 158 and a zone sensor 160. Although only one zone thermostat 158 and one zone sensor 160 are shown, each of the zones 202, 204, 206 may comprise a zone thermostat 158 and/or a zone sensor 160. In some embodiments, a zone thermostat 158 may communicate with the system controller 106 and may allow a user to control a temperature setting, a humidity setting, and/or other environmental setting for the zone 202, 204, 206 in which the zone thermostat 158 is located. Further, the zone thermostat 158 may communicate with the system controller 106 to provide temperature, humidity, and/or other environmental feedback regarding the zone 202, 204, 206 in which the zone thermostat 158 is located. A zone sensor 160 may also communicate with the system controller 106 to provide temperature, humidity, and/or other environmental feedback regarding the zone 202, 204, 206 in which the zone sensor 160 is located.

The system controller 106 may be configured for bidirectional communication with any zone thermostat 158 and/or zone sensor 160 so that a user may, using the system controller 106, monitor and/or control any of the HVAC system 100 components regardless of which zones 202, 204, 206 the zone thermostat 158 and/or zone sensor 160 may be associated. Further, each system controller 106, each zone thermostat 158, and each zone sensor 160 may comprise a temperature sensor and/or a humidity sensor. As such, it will be appreciated that structure 201 is equipped with a plurality of temperature sensors and/or humidity sensors in the plurality of different zones 202, 204, 206. In some embodiments, a user may effectively select which of the plurality of temperature sensors and/or humidity sensors is used to control operation of the HVAC system 100. Thus, when at least one of the system controller 106, the zone thermostat 158, and the zone sensor 160 determines that a temperature and/or humidity of an associated zone has fallen outside either the temperature setting or the humidity setting, respectively, the system controller 106 may operate the HVAC system 100 in either the cooling mode or the heating mode to provide temperature conditioned air to at least one of the zones 202, 204, 206. The system controller 106 may also activate and/or operate the heat source 150 to provide heat and/or dehumidification while operating in the heating mode.

In operation, the indoor fan 110 may be configured to generate an airflow through the indoor unit 102 and/or the heat source 150 to deliver conditioned air from an air supply opening in the indoor unit 102, through the main supply duct 222, and to each of the plurality of zones 202, 204, 206 through each of the first zone supply duct 208, the second zone supply duct 210, and the third zone supply duct 212, respectively. Additionally, each of the first zone supply duct 208, the second zone supply duct 210, and the third zone supply duct 212 may comprise a zone damper 224 that regulates the airflow to each of the zones 202, 204, 206. In some embodiments, the zone dampers 224 may regulate the airflow to each zone 202, 204, 206 in response to a temperature or humidity sensed by at least one temperature sensor and/or humidity sensor carried by at least one of the system controller 106, the zone thermostat 158, and the zone sensor 160.

Air from each zone 202, 204, 206 may return to the main return duct 220 through each of the first zone return duct 214, the second zone return duct 216, and the third zone return duct 218. From the main return duct 220, air may return to the indoor unit 102 through an air return opening in the indoor unit 102. Air entering the indoor unit 102 through the air return opening may then be conditioned for delivery to each of the plurality of zones 202, 204, 206 as described above. Circulation of the air in this manner may continue repetitively until the temperature and/or humidity of the air within the zones 202, 204, 206 conforms to a target temperature and/or a target humidity as required by at least one of the system controller 106, the zone thermostat 158, and/or the zone sensor 160.

Figure 3A:
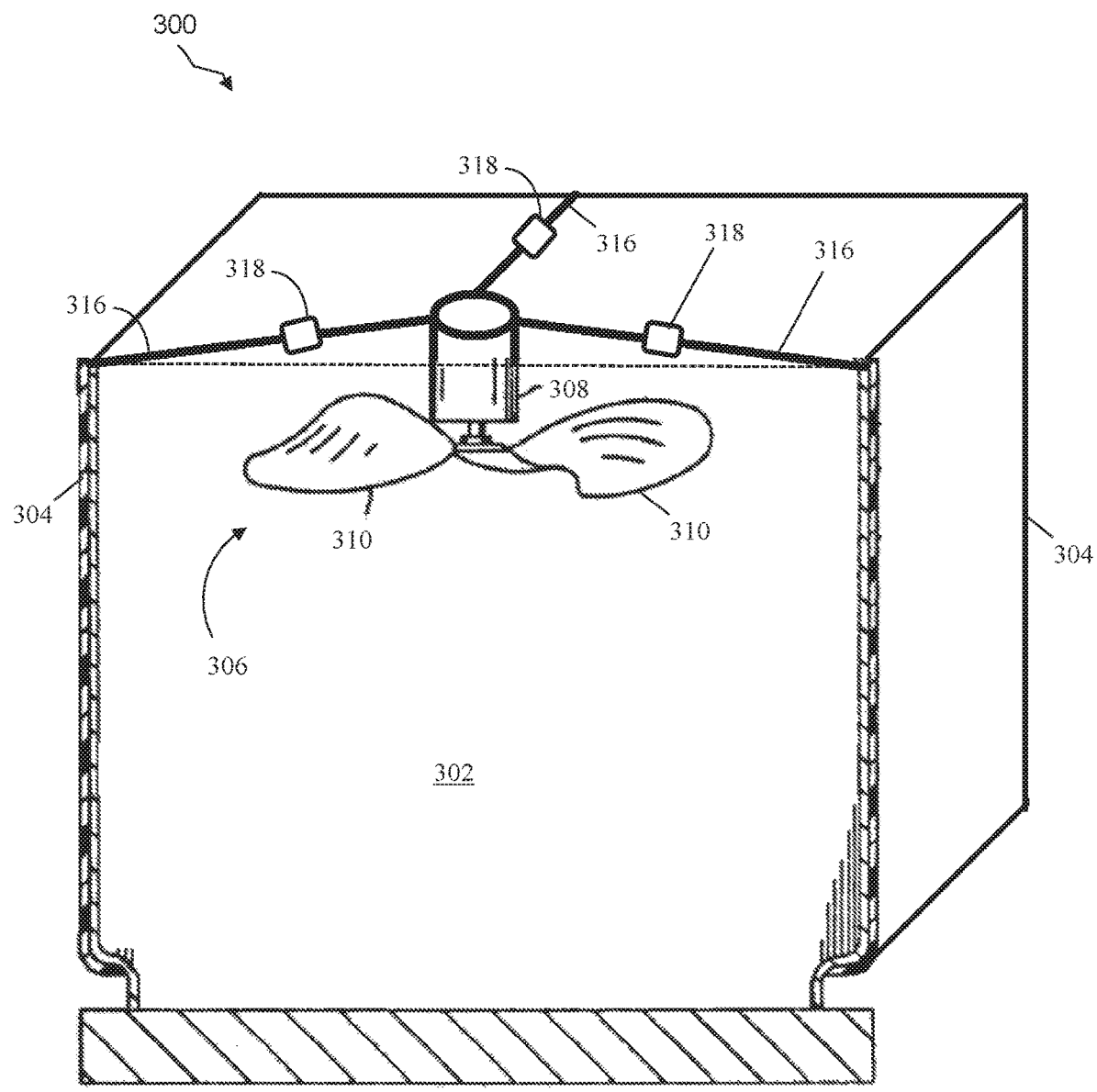
FIG. 3A is a schematic diagram of a tension support system according to an embodiment of the disclosure.

Referring now to FIG. 3A, a schematic diagram is shown of a tension support system 300 according to an embodiment of the disclosure. The tension support system 300 comprises an air conditioning unit 302, which may be substantially similar to the indoor unit 102 of FIGS. 1 and 2 and/or the outdoor unit 104 of FIG. 1. While the air conditioning unit 302 is depicted as having a boxlike structure, it is to be understood that the air conditioning unit 302 may comprise any suitable shape and/or configuration for accommodating parts associated with the air conditioning unit 302. The air conditioning unit 302 may comprise one or more side panels 304 defining an internal enclosure for housing one or more components such as, but not limited to, a fan assembly 306.

The fan assembly 306 may be substantially similar to the indoor fan 110 and/or outdoor fan 118 of FIGS. 1 and 2. The fan assembly 306 generally comprises a motor 308 operatively connected to N fan blades 310, where N is a positive integer greater than or equal to one. In operation, the motor 308 may be configured to drive the fan assembly 306 by selectively rotating the shaft of the motor 308. The selective rotation of the motor's shaft may cause the fan blades 310 to rotate, thereby creating a system pressure to generate airflow through components of the HVAC system 100 of FIGS. 1 and 2.

Figure 3B:
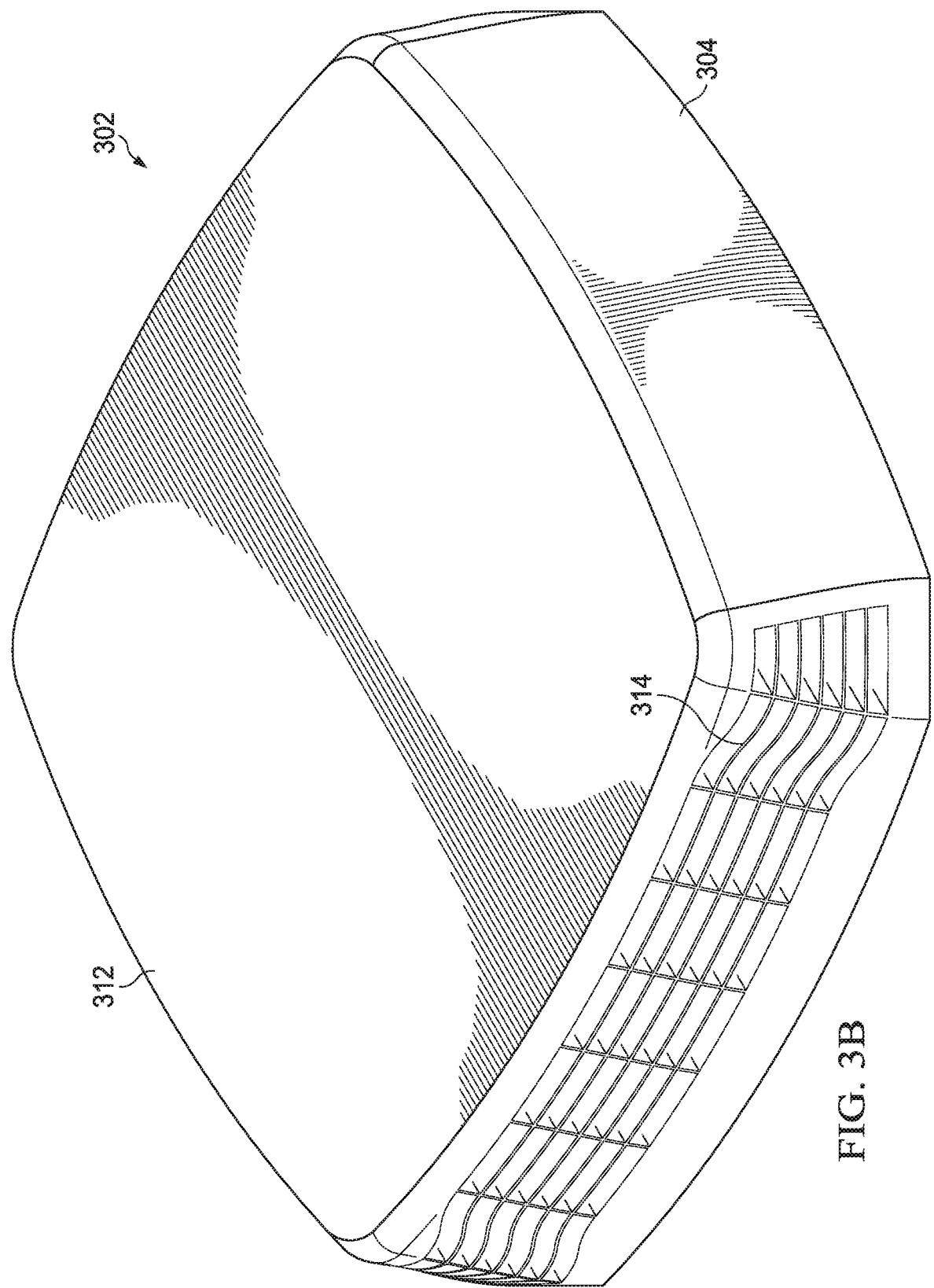
FIG. 3B is a schematic diagram of an air conditioning unit depicted in the tension support system of FIG. 3A.

In some implementations, the air conditioning unit 302 may comprise a top panel 312, such as shown in FIG. 3B. In addition, at least one side panel 304 of the air conditioning unit 302 may be replaced or combined with a ventilated grill 314 through which air may pass. While FIG. 3B depicts the grill 314 in place of one of the side panels 304, the air conditioning unit 302 may be configured such that the top panel 312 is replaced or combined with the grill 314 (i.e., in addition to or instead of at least one side panel 304 being replaced or combined with a grill 314). In other implementations, the air conditioning unit 302 may not include the top panel 312 and/or the grill 314. Alternatively, the air conditioning unit 302 may include the top panel 312 and/or the grill 314, but the top panel 312 and/or the grill 314 may be attached to the air conditioning unit 302 via removable fasteners (not shown).

According to some aspects, the side panel(s) 304 and/or top panel 312 may be composed of material(s) designed to protect the air conditioning unit 302 and its components from external elements. For example, if the air conditioning unit 302 is employed outdoors (e.g., as in outdoor unit 104), the side panels 304, top panel 312, and/or grill 314 may be composed from one or more high-grade plastics, metals, or other suitable materials configured to protect the air conditioning unit 302 from foreign objects and/or withstand harsh weather conditions.

In an embodiment, the fan assembly 306 may be suspended within the air conditioning unit 302 via one or more connectors 316 (e.g., rods, wires, cables, etc.) coupling the fan's motor 308 to one or more respective side panels 304. That is, rather than connecting the fan's motor 308 to the top panel 312 and/or grill 314 as in conventional air conditioning units, connectors 316 may secure the fan's motor 308 such that the structure of the side panels 304 directly support the fan assembly 306 (e.g., without physically contacting the top panel 312 and/or grill 314). Therefore, the top panel 312 and/or grill 314 may be designed to have any suitable shape or configuration desired, i.e., without being constrained by the fan assembly 306 that would otherwise be connected to the top panel 312 and/or grill 314 in a conventional air conditioning unit.

It is to be understood that while three connectors 316 are depicted in FIG. 3A, more or less connectors 316 may be used in other implementations. It is also to be understood that the length and/or diameter of the connectors 316 may be modified to accommodate components (e.g., air conditioning unit 302, fan assembly 306, etc.) of any suitable size or configuration.

According to some aspects, parts associated with the air conditioning unit 302 such as wires and cables may be embedded in one or more of the connectors 316. For instance, the fan motor 308 may be connected to a control board (not shown) via a conduit/cable (not shown) configured to supply power and signals. This conduit/cable may be susceptible to damage (e.g., from being bent) when the top panel 312 is removed. To better protect components from such damage, components such as the conduit/cable, electrical wires, and the like may be embedded with one or more connectors 316.

In some embodiments, the connectors 316 may include removable fasteners for securing the motor 308 to the side panels 304. Such fasteners may include any suitable components such as hooks, removable endpins, removable latch pins, or the like. As such, tasks such as disconnecting the motor 308 may be carried out relatively quickly. Similarly, because the motor 308 is not connected to a cover such as the top panel 312, accessing the interior of the air conditioning unit 302 (e.g., to service or change parts, remove debris, etc.) may be achieved by simply removing the top panel 312.

By comparison, such tasks in conventional air conditioning units may be relatively more extensive since the fan motor is typically secured to a top cover (e.g., panel 312) via fasteners such as screws. Removing the fan motor in such cases may be somewhat difficult due to the weight and/or size of the fan motor. In addition, the fan motor of a conventional air conditioning unit may be secured to a grill (e.g., grill 314) that is attached to the top cover (e.g., panel 312). Thus, disconnecting the fan motor from a conventional air conditioning unit may entail a multi-step process (e.g., removing a first set of screws attaching the fan to the grill, and then removing a second set of screws attaching the grill to the top cover).

In addition, some conventional air conditioning units include a brace or beam to support the fan motor. However, a brace or beam may not be necessary in an air conditioning unit 302 according to the present embodiments, as the fan assembly 306 may be independently supported by the connectors 316 securing the side panels 304 to the fan motor 308. By eliminating such a brace or beam from the air conditioning unit 302, the fan assembly 306 may operate more efficiently and/or quietly. For example, it may not be necessary to increase fan speed to compensate for airflow that might otherwise be disrupted by a brace or beam. Furthermore, the fan assembly 306 may employ a smaller sized motor 308 and/or run at lower speeds, thereby reducing noise, structural vibrations, and energy consumption.

If desired, noise may also be reduced by designing one or more parts of the air conditioning unit 302 (e.g., side panels 304, top panel 312, grill 314, connectors 316, etc.) with noise-absorbent material. Additionally or alternatively, one or more parts of the air conditioning unit 302 (e.g., side panels 304, top panel 312, grill 314, connectors 316, etc.) may be designed with elements designed to reduce vibrations, such as, but not limited to, vibration isolators, suspension devices, dampers, resilient pads, mechanical springs, pneumatic devices, or the like.

According to some aspects, the connectors 316 may comprise tension wires or stiffening rods having an adjustment device 318 configured to adjust the compression or tension of the connectors 316 such that the fan assembly 306 is securely suspended within the air conditioning unit 302. In particular, each adjustment device 318 may be configured to provide sufficient compression or tension so as to rigidly secure the fan assembly 306 to the side panels 304, while eliminating or minimizing structural resonance in the air conditioning unit 302 during operation of the fan motor 308.

While FIG. 3A depicts each adjustment device 318 arranged on a respective connector 316, it is to be understood that the adjustment device 318 may be arranged elsewhere (e.g., within or outside the tension support system 300) in other implementations. Moreover, the adjustment device 318 may comprise any suitable mechanism to adjust compression or tension of the connectors 316 to securely push or pull the fan motor 308 in place, and such that the connectors 316 effectively isolate the air conditioning unit 302 from vibrations during operation of the motor 308.

For example, in aspects where the connectors 316 comprise tension wires (or the like), the adjustment device 318 may comprise a pulley spring mechanism such as those utilized in suspension bridge systems. For instance, the pulley spring mechanism 318 may be configured to increase or decrease tension so that sag in the respective tension wire 316 is reduced or increased, respectively. Ideally, the tension in each wire 316 should be such that the fan assembly 306 is rigidly supported by opposing forces applied by each pulley spring mechanism 318.

In aspects where the connectors 316 comprise stiffening rods, the adjustment device 318 may comprise an adjustable screw or knob that may be turned (e.g., clock-wise or counter clock-wise) to increase or decrease tension of the respective stiffening rod 316. Similarly, the adjustment device 318 may comprise a tuning ring configured to tighten or loosen each respective stiffening rod 316. Ideally, tension should be adjusted such that the stiffness of each stiffening rod 316 prevents vibrations from being transferred to the air conditioning unit 302 during operation of the fan motor 308.

In an embodiment, the adjustment device 318 may be configured to adjust tension of the respective connector 316 to an optimal level such that the air conditioning unit 302 exhibits minimal, if any, structural resonance from the motor 308 during operation of the fan assembly 306. The adjustment device 318 may also be configured such that little to no further adjustments will be necessary once the tension of the respective connector 316 is set to the optimal level (i.e., barring unforeseeable circumstances).

In some embodiments, the adjustment device 318 may include an indicator representing the tension of a respective connector 316 based on the current position or arrangement of the adjustment device 318. For instance, if the adjustment device 318 comprises a knob or dial configured to adjust the tension of the respective connector 316 by being turned to different positions, the knob or dial may include an indicator representing the tension of the connector 316 for each position the knob or dial is capable of assuming.

Furthermore, one or more components associated with the tension support system 300 (e.g., air conditioning unit 302, fan assembly 306, connectors 316, etc.) may include a label identifying an indicator representing the optimal tension level of a respective connector 316 (i.e., such that the air conditioning unit 302 exhibits little to no structural resonance during operation of that particular fan assembly 306). This way, a user such as a field agent may easily adjust the tension of a respective connector 316 to an optimal level by shifting the adjustment device 318 to the position corresponding to the indicator identified by the label.

Generally speaking, the optimal tension level of a connector 316 may depend upon the particular fan assembly 306 to be supported in the air conditioning unit 302. For instance, the optimal tension level may depend upon various factors such as, but not limited to, the size and/or weight of the motor 308, the type of fan blade 310 (e.g., paddle blade, swept blade, etc.), the number of fan blades 310, torque pulsation of the motor 308, fan speed, etc. Additionally, the optimal tension level may change over time due to conditions outside the control of the fan assembly 306.

As an example, the air conditioning unit 302 may originally be positioned on a relatively flat surface, but later repositioned onto a relatively uneven surface. As a result, the fan assembly 306 may become tilted or reoriented such that the air condition unit 302 begins to exhibit structural resonance during operation of the fan assembly 306. If so, the indicator identified by the label may be updated to represent a new optimal tension level of each connector 316 such that the air conditioning unit 302 exhibits little to no structural resonance when the adjustment device 318 assumes the position corresponding to the updated indicator.

As another example, the air conditioning unit 302 may be situated in a particularly dusty location where the fan blades 310 accumulate dust over time. The accumulation of such dust may eventually alter the weight of the fan blades 310, thereby impacting operation of the fan assembly 306. If the impact causes the air conditioning unit 302 to exhibit structural resonance during operation of the fan assembly 306, the indicator identified by the label may be updated as discussed in the previous example.

In some embodiments, the adjustment device 318 may be supplemented and/or replaced by features integrated with the connectors 316. As a non-limiting example, at least one connector 316 may comprise an adjustable stiffening rod 316 such as depicted in FIG. 4. According to this example, the stiffening rod 316 may comprise an outer portion such as a tuning ring 320 configured to selectively engage an inner portion 322 to adjust tension of the stiffening rod 316. As such, the adjustment device 318 may be optional. Alternatively, the adjustment device 318 may correspond to the tuning ring 320. For the sake of clarity, the following discussion assumes that the tuning ring 320 is separate from the adjustment device 318, which may be optionally included as a secondary mechanism to adjust tension of the stiffening rod 316.

According to some implementations, the tuning ring 320 may include a threaded internal cavity configured to engage threading on the inner portion 322 so that tension of the stiffening rod 316 may be adjusted by rotating the tuning ring 320 about a central axis defined by the internal cavity. In the example depicted in FIG. 4, tension of the stiffening rod 316 may be increased and decreased by rotating the tuning ring 320 clock-wise and counter clock-wise, respectively. In other examples, however, the engagement between the tuning ring 320 and the inner portion 322 may be such that tension of the stiffening rod 316 is increased and decreased by rotating the tuning ring 320 counter clock-wise and clock-wise, respectively.

In an embodiment, the stiffening rod 316 may include markings spaced about the periphery of the stiffening rod 316, each marking representing a particular tension level. As a non-limiting example, if tension of the stiffening rod 316 may be adjusted by rotating the tuning ring 320 between three different positions, the periphery of the stiffening rod 316 may include numerical markings (e.g., "1," "2," and "3") or some other indicia to represent the tension of the stiffening rod 316 based on the current position of the tuning ring 320.

As previously discussed, some component(s) of the tension support system 300 may include a label identifying an indicator representing the optimal tension level of a particular connector 316. For example, if it is determined that the air conditioning unit 302 exhibits the least amount of structural resonance when the tuning ring 320 of the stiffening rod 316 is turned to position number "2," one or more components of the tension support system 300 may include a label identifying position number "2."

As shown in FIG. 4, a removable endpin 330 may be used to secure one end of the stiffening rod 316 to a side panel 304 of the air conditioning unit 302. A similar endpin (not shown) may also be used to secure an opposite end of the stiffening rod 316 to the motor 308. In other implementations, a different type of removable fastener may be used to secure one or both sides of the stiffening rod 316 to the side panel 304 and/or the motor 308.

Figure 5:
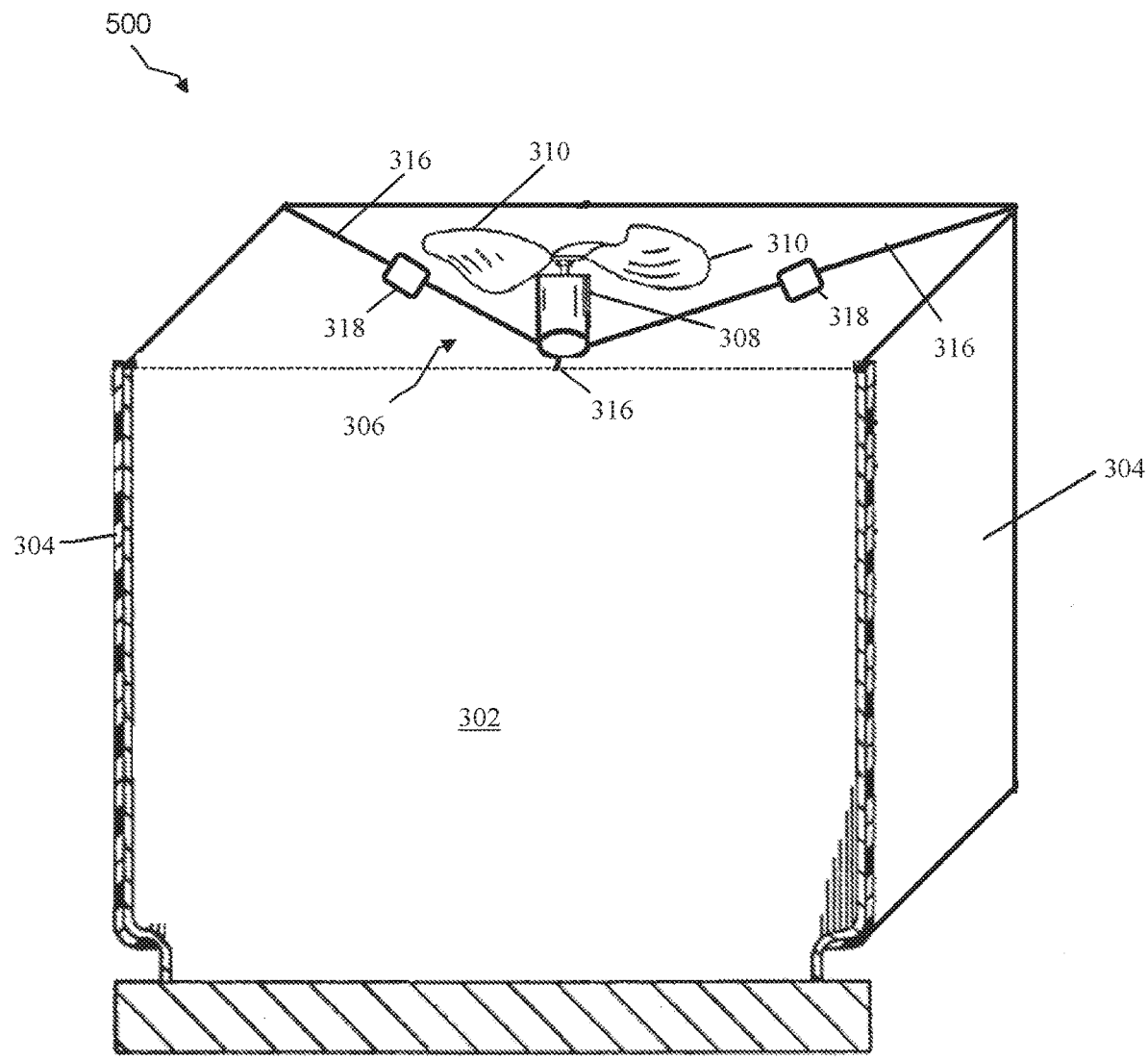
FIG. 5 is a schematic diagram of a tension support system according to another embodiment of the disclosure.

Referring now to FIG. 5, a schematic diagram is shown of a tension support system 500 according to another embodiment of the disclosure. Unless stated otherwise, the tension support system 500 is substantially the same as tension support system 300 of FIG. 3A. Therefore, the concepts discussed above with respect to FIGS. 3A, 3B, and 4 are similarly applicable to the tension support system 500 of FIG. 5.

The primary difference between systems 300 and 500 is that the fan assembly 306 in FIG. 5 may operate without concern of airflow being partially obstructed by the fan motor 308, as the fan blades 310 are arranged above the fan motor 308 in FIG. 5. This arrangement is made possible in view of the fact that the fan assembly 306 is structurally secured by the side panels 304 of the air conditioning unit 302 (e.g., instead of by a top panel 312 or grill 314 as in conventional units).

One other difference between systems 300 and 500 is that the air conditioning unit 302 in FIG. 3A may include a central top cover patch (not shown) used to hold the fan motor 308. However, this may block central airflow during operation of the fan assembly 306, and therefore, the patch may be removed from the air conditioning unit 302 in the embodiment of FIG. 5. As such, the embodiment depicted in FIG. 5 may be preferred over that depicted in FIG. 3A in applications where it may be desirable to increase air flow and/or provide improved cooling for the fan motor 308.

In some embodiments, the fan assembly 306 depicted in FIG. 3A and/or FIG. 5 may be installed in the air conditioning unit 302 according to a horizontal application. In such applications, airflow may be discharged from the air conditioning unit 302 in a horizontal direction rather than a vertical direction as in FIGS. 3A and 5. Moreover, the tension support system 300 may be applied to support any type of fan assembly 306. Briefly, for example, the fan assembly 306 may comprise blowers or fans such as, but not limited to, centrifugal blowers, pressure blowers, volume blowers, centrifugal fans, axial fans, radial fans, diagonal fans, mixed-flow fans, cross-flow fans, propeller fans. In addition, the tension support system 300 may support one or more such fans and/or blowers within any type of housing, e.g., a housing composed of plastic, metal, or both.

Furthermore, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value.

Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A heating, ventilation, and/or air conditioning (HVAC) system, comprising:
   an air conditioning unit;
   a fan assembly disposed within the air conditioning unit, wherein the fan assembly comprises a centrifugal blower or an axial fan;
   multiple connectors coupling a motor of the fan assembly to inner walls of the air conditioning unit such that the fan assembly directly suspends from the inner walls, wherein the multiple connectors comprise at least three tension wires; and
   at least one tension adjustment device comprising a pulley spring unit configured to adjust tension in each respective tension wire such that the inner walls do not exhibit structural resonance resulting from vibrations emanating from the motor during operation of the fan assembly.

2. The HVAC system of claim 1, wherein the fan assembly further comprises a set of fan blades configured to direct air out of the air conditioning unit, the set of blades being disposed above the motor such that the motor does not obstruct air directed out of the air conditioning unit.

3. The HVAC system of claim 1, wherein the multiple connectors secure the motor to the inner walls via removable fasteners.

4. The HVAC system of claim 3, wherein the removable fasteners comprise hooks.

5. The HVAC system of claim 3, wherein the removable fasteners comprise endpins.

6. The HVAC system of claim 3, wherein the removable fasteners comprise latch pins.

7. The HVAC system of claim 1, wherein the fan assembly is physically isolated from a cover of the air conditioning unit, the cover being disposed on top of the inner walls.

8. The HVAC system of claim 7, wherein the inner walls comprise plastic panels.

9. The HVAC system of claim 7, wherein the inner walls comprise metal panels.

10. A heating, ventilation, and/or air conditioning (HVAC) system, comprising:
    an air conditioning unit;
    a fan assembly disposed within the air conditioning unit, wherein the fan assembly comprises a centrifugal blower or an axial fan;
    multiple connectors coupling a motor of the fan assembly to inner walls of the air conditioning unit such that the fan assembly directly suspends from the inner walls, wherein the multiple connectors comprise at least three stiffening rods; and
    a tension adjustment device comprising at least three tuning rings coupled to the at least three stiffening rods, respectively, wherein each tuning ring is configured to adjust stiffness of each respective stiffening rod such that the air conditioning unit does not exhibit structural resonance resulting from vibrations emanating from the motor during operation of the fan assembly.

11. The HVAC system of claim 10, wherein each tuning ring includes a rotatable portion in threading engagement with an inner portion of each stiffening rod such that tension of each stiffening rod is adjusted by rotating the rotatable portion about a central axis defined by the inner portion.

12. The HVAC system of claim 10, wherein the fan assembly comprises a set of fan blades configured to direct air out of the air conditioning unit, the set of blades being disposed above the motor such that the motor does not obstruct air directed out of the air conditioning unit.

13. The HVAC system of claim 10, wherein the multiple connectors secure the motor to the inner walls via removable fasteners.

14. The HVAC system of claim 13, wherein the removable fasteners comprise hooks.

15. The HVAC system of claim 13, wherein the removable fasteners comprise endpins.

16. The HVAC system of claim 13, wherein the removable fasteners comprise latch pins.

17. The HVAC system of claim 10, wherein the fan assembly is physically isolated from a cover of the air conditioning unit, the cover being disposed on top of the inner walls.

18. The HVAC system of claim 17, wherein the inner walls comprise plastic panels.

19. The HVAC system of claim 17, wherein the inner walls comprise metal panels.

20. The HVAC system of claim 10, wherein at least one power cable associated with the air conditioning unit is embedded with one of the stiffening rods.

* * * * *